(12) United States Patent
Oko et al.

(10) Patent No.: US 6,218,038 B1
(45) Date of Patent: Apr. 17, 2001

(54) REGULATING A FLOW THROUGH A FUEL CELL

(75) Inventors: Uriel M. Oko, Glenmont; Wieslaw J. Zielinski, Latham, both of NY (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/382,293

(22) Filed: Aug. 24, 1999

(51) Int. Cl.7 .................................................. H01M 2/00
(52) U.S. Cl. ................. 429/34; 429/12; 429/13; 429/22; 429/23; 429/25; 429/38; 429/39
(58) Field of Search ................. 429/12, 13, 34, 429/22, 25, 17, 19, 38, 39

(56) References Cited

U.S. PATENT DOCUMENTS

| 4,226,919 | 10/1980 | Stiiwe . |
|---|---|---|
| 4,362,788 | 12/1982 | Maru et al. . |
| 4,509,548 | 4/1985 | Grasso . |
| 4,528,251 | 7/1985 | Yamaguchi et al. . |
| 4,555,452 | 11/1985 | Kahara et al. . |
| 4,686,157 | 8/1987 | Miyake et al. . |
| 4,729,930 | 3/1988 | Beal et al. . |
| 4,759,997 | 7/1988 | Ohyauchi et al. . |
| 4,904,547 | 2/1990 | Mizumoto et al . |
| 4,963,443 | 10/1990 | Kamoshita . |
| 5,059,494 | 10/1991 | Vartanian et al. . |
| 5,441,821 | 8/1995 | Merritt et al. . |

*Primary Examiner*—Stephen Kalafut
*Assistant Examiner*—Angela J. Martin
(74) *Attorney, Agent, or Firm*—Trop, Pruner & Hu, P.C.

(57) ABSTRACT

An assembly includes fuel cell plates and a valve. The fuel cell plates are arranged to form a fuel cell, and the plates establish a manifold passageway to communicate a fluid for the fuel cell. At least one of the plates includes flow channels to communicate the fluid through the fuel cell. The valve selectively regulates communication of the fluid between the manifold passageway and the channels.

43 Claims, 9 Drawing Sheets

REGULATING A FLOW THROUGH A FUEL CELL

BACKGROUND

The invention relates to regulating a flow through a fuel cell.

A fuel cell is an electrochemical device that converts chemical energy produced by a reaction directly into electrical energy. For example, one type of fuel cell includes a proton exchange membrane (PEM), a membrane that may permit only protons to pass between an anode and a cathode of the fuel cell. At the anode, diatomic hydrogen (a fuel) is oxidized to produce hydrogen protons that pass through the PEM. The electrons produced by this oxidation travel through circuitry that is external to the fuel cell to form an electrical current. At the cathode, oxygen is reduced and reacts with the hydrogen protons to form water. The anodic and cathodic reactions may be described by the following equations:

$H_2 \rightarrow 2H^+ + 2e^-$ at the anode of the cell, and $O_2 + 4H^+ + 4e^- \rightarrow 2H_2O$ at the cathode of the cell.

Because a single fuel cell typically produces a relatively small voltage (around 1 volt, for example), several serially connected fuel cells may be formed out of an arrangement called a fuel cell stack to produce a higher voltage. The fuel cell stack may include different plates that are stacked one on top of the other in the appropriate order, and each plate may be associated with more than one fuel cell of the stack. The plates may be made from a metal or graphite composite material (as examples) and include various channels and orifices to, as examples, route the above-described reactants and products through the fuel cell stack. Several PEMs (each one being associated with a particular fuel cell) may be dispersed throughout the stack between the anodes and cathodes of the different fuel cells. The anode and the cathode may each be made out of an electrically conductive gas diffusion material, such as a carbon cloth or paper material, for example.

Referring to FIG. 1, as an example, a fuel cell stack 10 may be formed out of repeating units called plate modules 12. In this manner, each plate module 12 includes a set of composite plates that may form several fuel cells. For example, for the arrangement depicted in FIG. 1, an exemplary plate module 12a may be formed from a cathode cooler plate 14, a bipolar plate 16, a cathode cooler plate 18, an anode cooler plate 20, a bipolar plate 22 and an anode cooler plate 24 that are stacked from bottom to top in the listed order. The cooler plate functions as a heat exchanger by routing a coolant through flow channels in either the upper or lower surface of the cooler plate to remove heat from the plate module 12a. The surface of the cooler plate that is not used to route the coolant includes flow channels to route either hydrogen (for the anode cooler plates 20 and 24) or oxygen (for the cathode cooler plates 14 and 28) to an associated fuel cell. The bipolar plates 16 and 22 include flow channels on one surface (i.e., on the top or bottom surface) to route hydrogen to an associated fuel cell and flow channels on the opposing surface to route oxygen to another associated fuel cell. Due to this arrangement, each fuel cell may be formed in part from one bipolar plate and one cooler plate, as an example.

For example, one fuel cell of the plate module 12a may include an anode-PEM-cathode sandwich, called a membrane-electrode-assembly (MEA), that is located between the anode cooler plate 24 and the bipolar plate 22. In this manner, tipper surface of the bipolar plate 22 includes flow channels to route oxygen near the cathode of the MEA, and the lower surface of the anode cooler plate 24 includes flow channels to route hydrogen near the anode of the MEA.

As another example, another fuel cell of the plate module 12a may be formed from another MEA that is located between the bipolar plate 22 and the cathode cooler plate 20. The lower surface of the bipolar plate 22 includes flow channels to route hydrogen near the anode of the MEA, and the upper surface of the cathode cooler plate 24 includes flow channels to route oxygen near the cathode of the MEA. The other fuel cells of the plate module 12a may be formed in a similar manner.

During the course of its lifetime, one or more of the fuel cells of the fuel cell stack 10 may fail. When this occurs, the entire fuel cell stack 10 typically must be shut down, and thus, the power that the fuel cell stack 10 furnishes (to a house, for example) is turned off.

SUMMARY

In one embodiment of the invention, an assembly includes fuel cell plates and a valve. The fuel cell plates are arranged to form at least one fuel cell, and the plates establish a manifold passageway to communicate a fluid for the fuel cell. At least one of the plates includes flow channels to communicate the fluid through the fuel cell. The valve selectively regulates communication of the fluid between the manifold passageway and the flow channels.

Advantages and other features of the invention will become apparent from the following description, from the drawing and from the claims.

DETAILED DESCRIPTION

Figure 1:
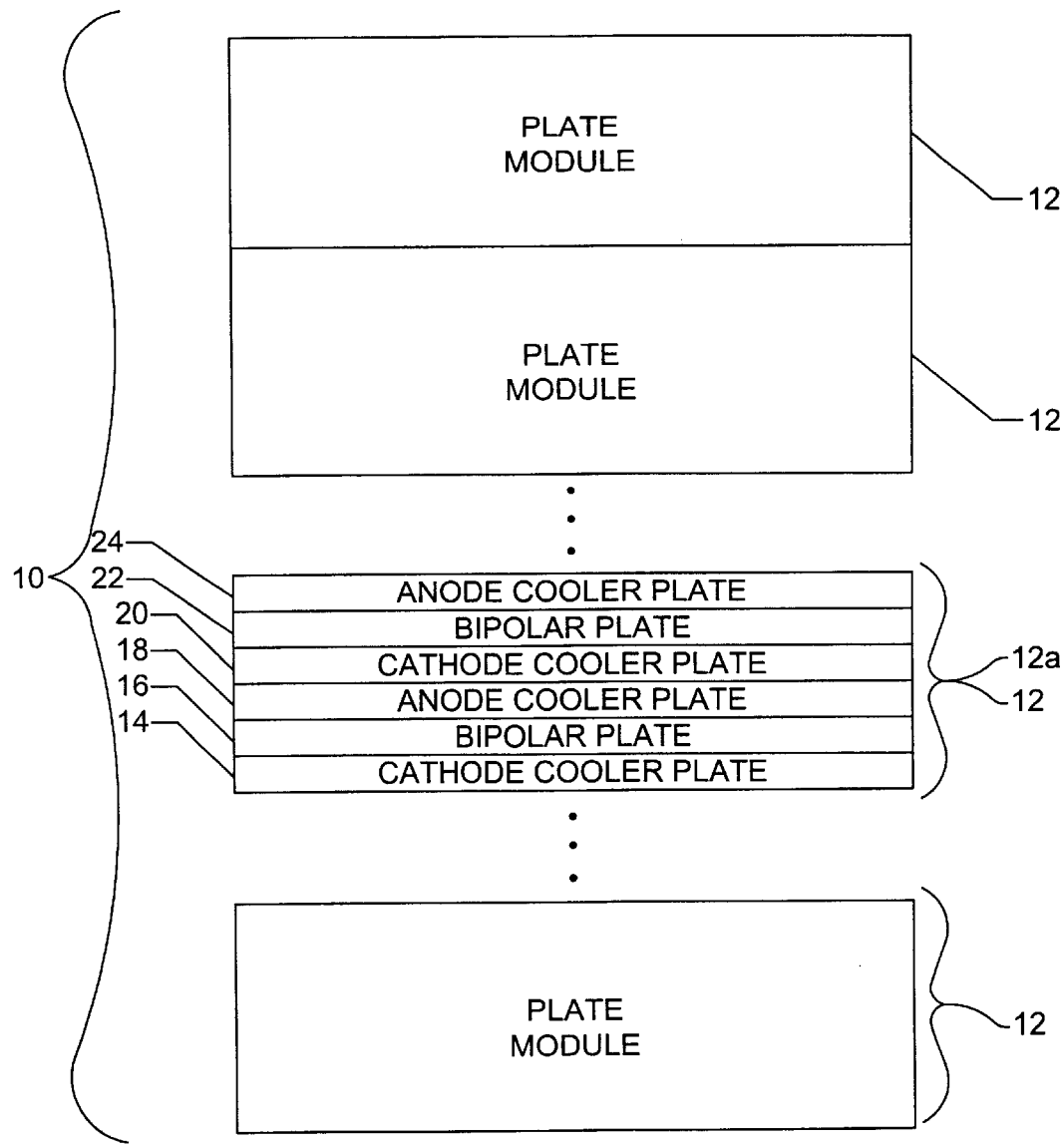
FIG. 1 is a schematic diagram illustrating a fuel cell stack according to the prior art.
Figure 2:
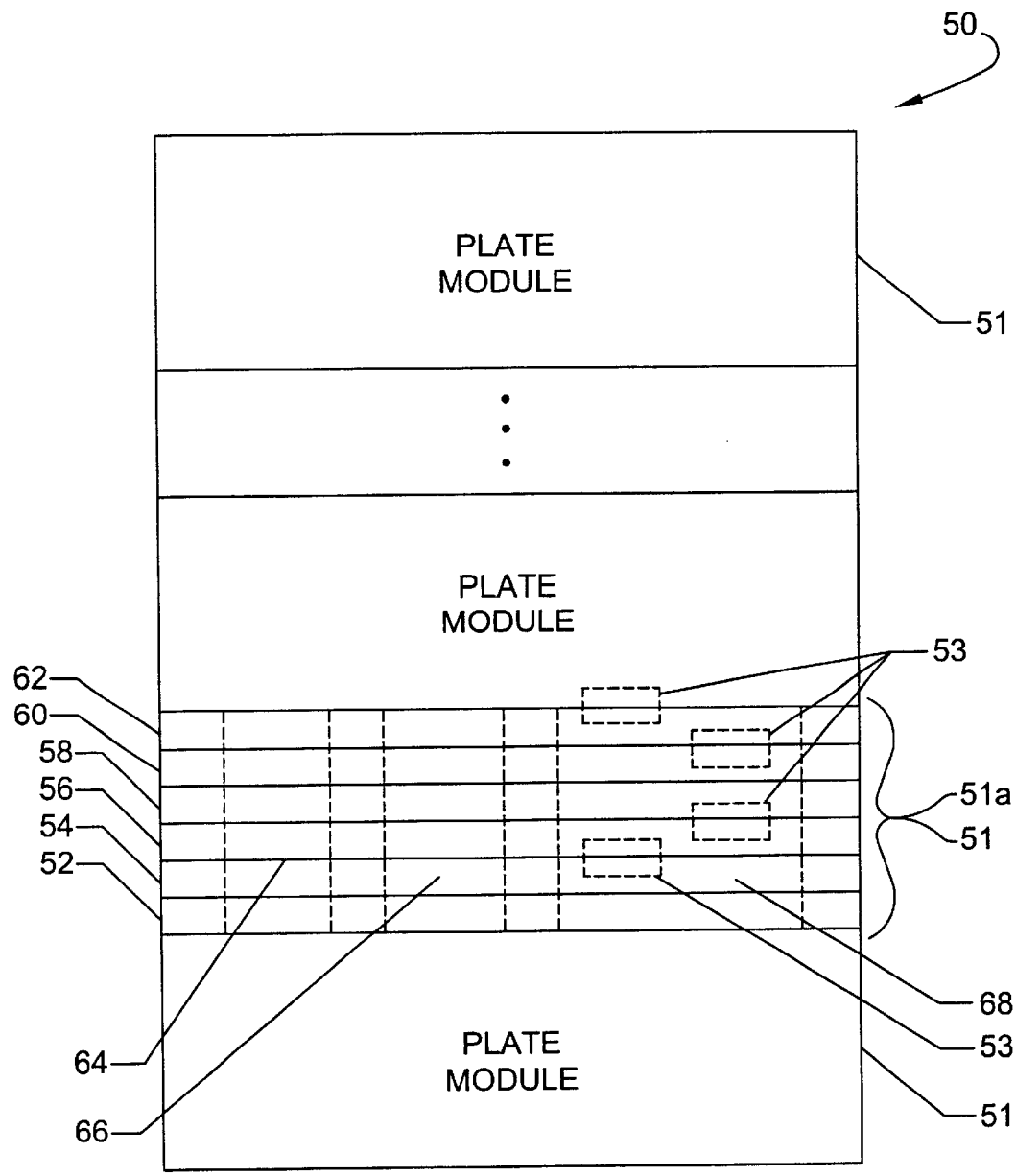
FIG. 2 is a side view of a fuel cell stack according to an embodiment of the invention.

Referring to FIG. 2, an embodiment 50 of a fuel cell stack in accordance with the invention includes valves 53 to regulate fluid flows through fuel cells of the stack 50. Therefore, as described in more detail below, fuel cells of the stack 50 may be selectively regulated and if necessary, shut down without shutting down the entire stack 50.

More specifically, the fuel cell stack 50 may be formed from repeating units called plate modules 51. An exemplary plate module 51*a* (having a design similar to the other plate modules 51) is depicted in FIG. 2. As shown, the plate module 51*a* includes flow plates (graphite composite plates, for example) that include flow channels to form several (four, for example) fuel cells. For example, the plate module 51*a* may include the following flow plates: bipolar plates 54 and 60; cathode cooler plates 52 and 58; and anode cooler plates 56 and 62.

Figure 3:
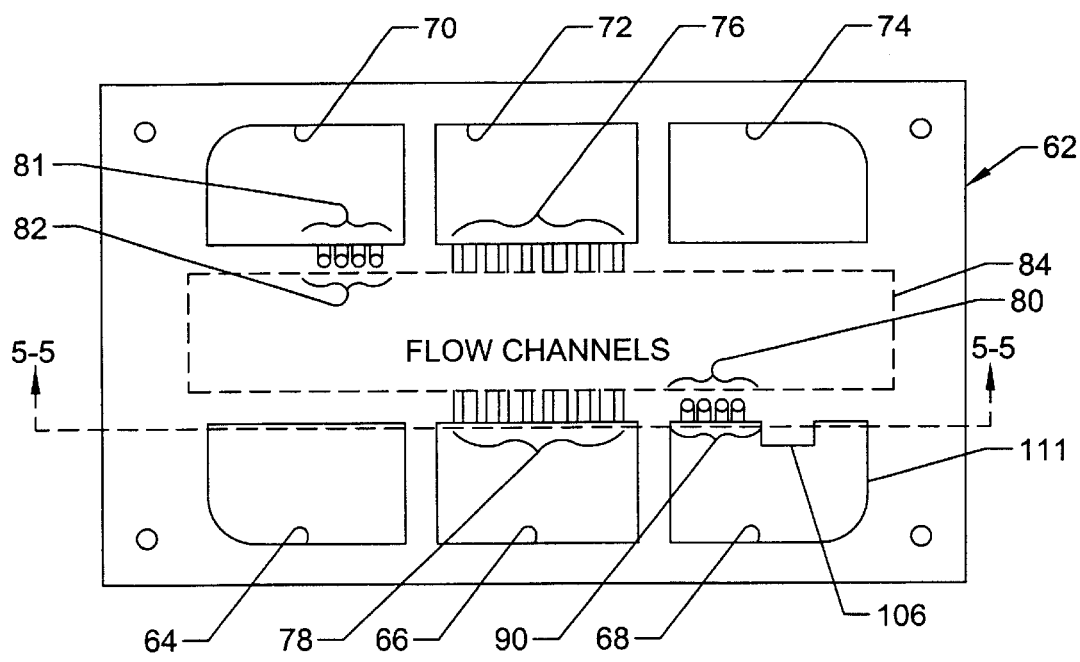
FIG. 3 is a top view of an anode cooler plate of the fuel cell stack of FIG. 2 according to an embodiment of the invention.

Referring also to FIG. 3 that depicts a top view of the anode cooler plate 62, the plates include openings that form a manifold for communicating the reactants for the fuel cells and a coolant (Thenninol D-12 made by Solutia Inc., for example) to and from the various surface flow channels of the plates. In this manner, the plates may include aligned openings that form a vertical inlet passageway 70 (see FIG. 3) of the manifold for introducing hydrogen to the plate module 51*a*, and the plates may include aligned openings that form a vertical outlet passageway 68 of the manifold for removing hydrogen from the plate module 51*a*. Similarly, openings in the plates may form vertical inlet 74 and outlet 64 passageways of the manifold for communicating oxygen (via an air flow); and the plates may include aligned openings that form vertical inlet 72 and outlet 66 passageways of the manifold for communicating the coolant.

Figure 4:
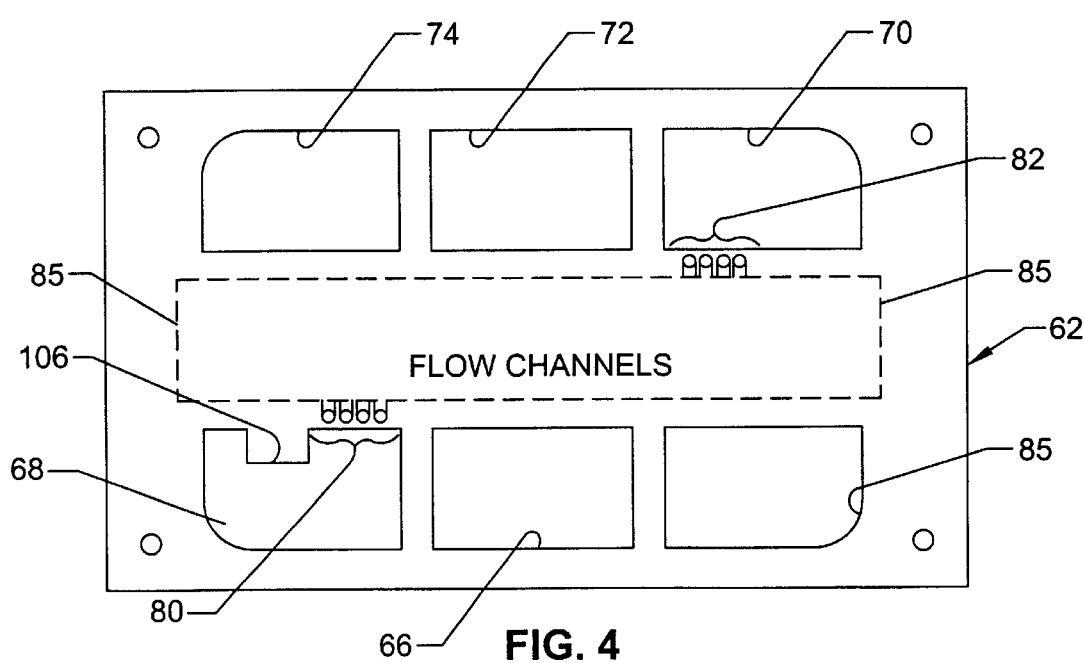
FIG. 4 is a bottom view of the anode cooler plate of the fuel cell stack of FIG. 2 according to an embodiment of the invention.

As an example of the fluid flows through the plate module 51*a*, the anode cooler plate 62 may include horizontal flow channels 84 on its upper surface (depicted in FIG. 3) through which the coolant flows to remove heat from the stack 50. For purposes of furnishing hydrogen to a membrane electrode assembly (MEA) that is located between the anode cooler plate 62 and the bipolar plate 60 (see FIG. 2), the hydrogen flows through horizontal flow channels 85 (see FIG. 4) on the lower surface of the anode cooler plate 62. Thus, the coolant flows through the upper surface flow channels 84 of the anode cooler plate 62, and hydrogen flows through the lower surface flow channels 85 of the anode cooler plate 62.

Figure 5:
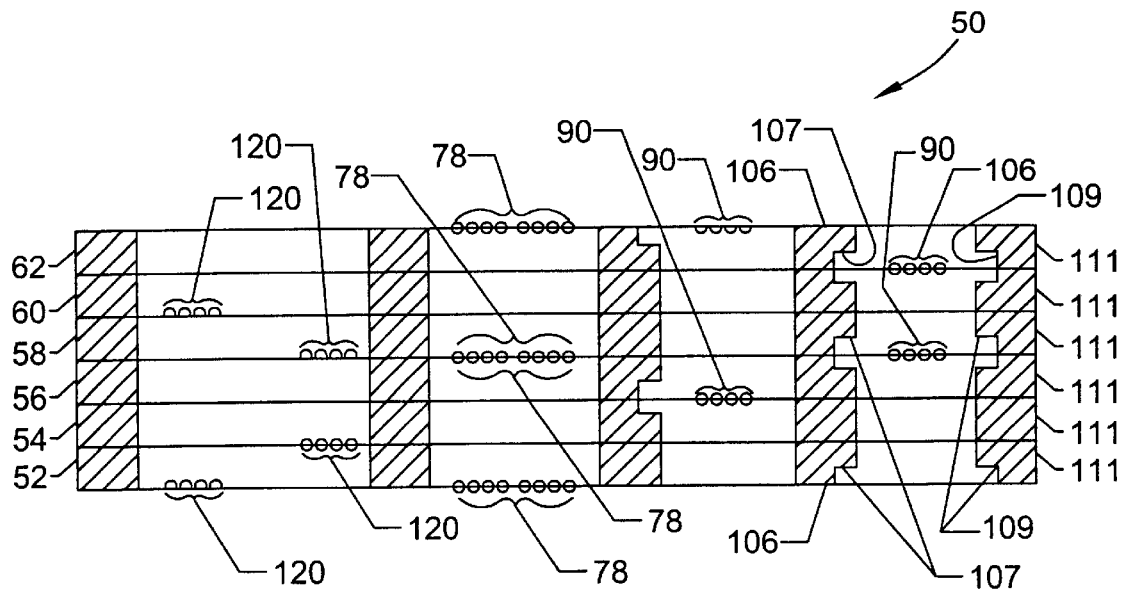
FIG. 5 is a cross-sectional view of the plate module taken along line 5—5 of FIG. 3.

To establish communication between the various horizontal flow channels and the vertical manifold passageways, the plates includes horizontal ports that are formed either in the upper or bottom surfaces of the plates. For example, referring to FIG. 5, to communicate with the hydrogen outlet passageway 68 (see also FIG. 3), the plates include sets 90 of horizontal outlet ports. Although the set 90 of ports is depicted in FIG. 5 as including four ports, the set 90 of ports may include fewer or more ports. To communicate with the coolant outlet passageway 66 (see also FIG. 3) and the oxygen outlet passageway 64 (see also FIG. 3), the plates includes sets 78 and 120, respectively, of horizontal outlet ports. The plates also include sets of horizontal inlet ports (not shown in FIG. 5) to communicate with the inlet manifold passageways 70, 72 and 74.

As an example, referring both to FIGS. 3 and 5, the upper surface of the anode cooler plate 62 includes a set 76 of horizontal outlet ports to receive water from the inlet passageway 72 and to communicate the coolant to the upper surface flow channels 84 of the anode cooler plate 62. In this manner, the coolant flows through the flow channels 84 to remove heat from the plate module 51*a*, and the coolant exits the flow channels 84 through a set 78 of horizontal outlet ports into the coolant outlet passageway 66. The upper surface of the anode cooler plate 62 also includes a set 81 of horizontal inlet ports that receive hydrogen from the hydrogen inlet passageway 70. Because the flow channels 85 (see FIG. 4) for the hydrogen are located on the lower surface of the anode cooler plate 62, the plate 62 includes vertical orifices 82 that extend through the plate 62 to route the incoming hydrogen into the flow channels 85. The hydrogen flows through the flow channels 85 and is subsequently routed to the upper surface of the plate 62 through vertical orifices 80. The hydrogen exits the plate 62 via a set 90 of horizontal outlet ports into the outlet passageway 68. Flows may be directed to the other plates of the plate module 51*a* in a similar fashion.

During the lifetime of the fuel cell stack 50, one or more of the fuel cells may fail. Conventionally, upon this occurrence, the entire fuel cell stack is shut down until repairs may be made. However, unlike conventional arrangements, the stack 50 includes the valves 53 (see FIG. 2) that may be used to selectively regulate communication between the lateral ports and at least one of the manifold passageways. More specifically, in some embodiments, the valves 53 may be operated (as described below) to control the communication of hydrogen between the sets 90 of outlet ports and the hydrogen outlet passageway 68. Therefore, each valve 53 may regulate the flow through a particular set 90 of ports and thus, may be used to control the flow of hydrogen through an associated fuel cell.

By controlling the flow of hydrogen through a particular fuel cell, the associated valve may be used to, for example, enhance the performance of the fuel cell or shut down the fuel cell, as described below. For example, the flow of hydrogen out of the set 90 of outlet ports may be selectively restricted to control the residence time of hydrogen in a particular fuel cell and thus, improve the fuel conversion rate of the fuel cell. As another example, if a fuel cell fails, the entire stack 50 does not have to be shut down, as the associated valve may be closed to shut off the flow of hydrogen through the fuel cell and thus, shut off the fuel cell. Although the control of communication between the sets 90 of outlet ports and the outlet passageway 68 is described below, other arrangements are possible. For example, in some embodiments, valves that are described below may be used to control communication between the sets 81 of ports and the hydrogen inlet passageway 70. As another example, the flow of oxygen and/or the flow of the coolant may also be controlled by controlling fluid in flows and/or out flows through the use of the valves described below. Thus, the flow of air into cathode cooler plates may also be controlled in a similar manner.

Figure 6:
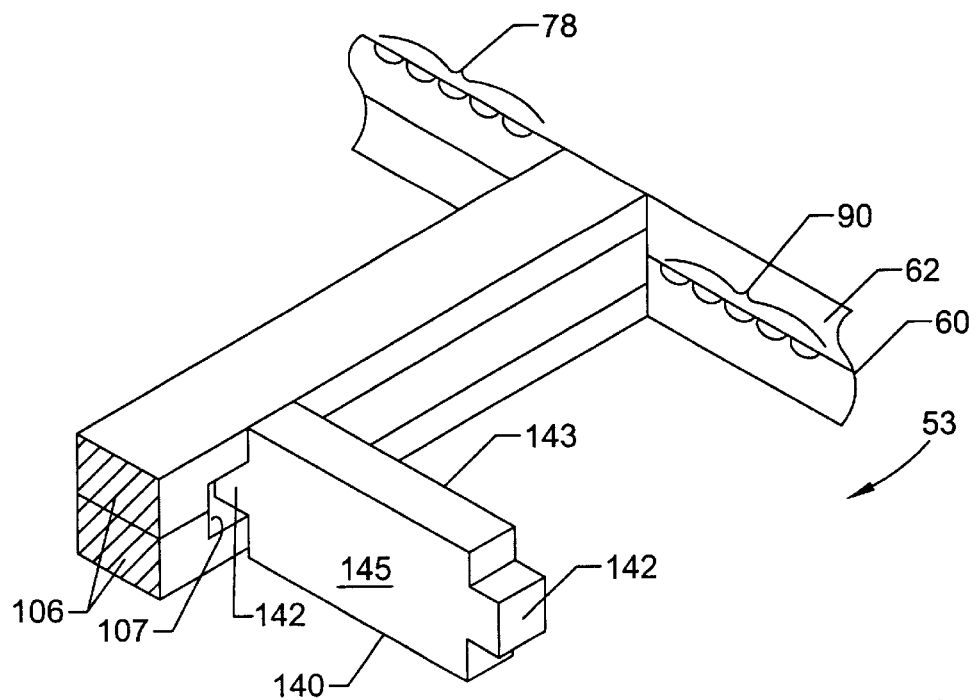
FIGS. 6, 9 and 12 are illustrations of valves of the fuel cell stack according to different embodiments of the invention.

In some embodiments, each set 90 of ports may be associated with a valve 53 that is depicted in more detail in FIG. 6. As described below, each valve 53 may be remotely operable so that the valve 52 may be remotely controlled from a region outside of the fuel cell stack 50.

Referring to FIG. 6, more particularly, in some embodiments, the valve 53 may include a sheet magnet 140 that may be operated via an externally applied magnetic field to open and close the associated set 90 of ports. To accomplish this, the plates may have horizontal extensions 106 (see also FIGS. 3 and 5) that partially extend into the hydrogen outlet passageway 68 to serve as a guide for the translational movement of the sheet magnet 140.

In this manner, a lateral groove 107 may be formed in the extension 106 of two adjacent plates to receive a side tab 142 of the sheet magnet 140. For example, for the set 90 of ports of the bipolar plate 60, the groove 107 may be formed in the horizontal extensions 106 of the bipolar plate 60 and the anode cooler plate 62. A groove 109 (that receives another side tab 142 of the sheet magnet 140) may also be formed in the portions 111 of the plates 60 and 62 that form a sidewall of the outlet passageway 68, and the grooves 107 and 109 may be substantially parallel to each other.

Thus, due to the above-described arrangement, a broad surface 143 (of the sheet magnet 140) that faces the set 90 of ports may confined to move to and from the set 90 of ports by the grooves 107 and 109. In some embodiments, the sheet magnet 140 has a horizontal magnetic moment that is generally parallel to its path of travel, and as a result, an external magnet (not shown in FIGS. 5 and 6) may be used to operate the valve 53 in the following maimer. When the external magnet produces a magnet field that is generally aligned with the magnetic moment of the sheet magnet 140, the sheet magnet 140 is repelled from the external magnet so that the surface 143 is pushed against the set 90 of ports to close the valve 53. When the external magnet produces a magnet field that is generally aligned in an opposite direction to the magnetic moment of the sheet magnet 140, the sheet magnet is attracted to the external magnet, and the surface 143 is pulled away from the set 90 of ports to open the valve 53.

For example, if the surface 143 of the sheet magnet 140 resides on the north pole of the sheet magnet 140 and an opposite surface 145 of the sheet magnet 140 resides on the south pole, then the magnetic moment of the sheet magnet is directed in a horizontal direction toward the set 90 of ports. In this manner, if the north pole of an external magnet comes close (i.e., comes closer than the south pole of the external magnet) to the surface 145, then the sheet magnet 140 pulls away from the set 90 of ports, and the valve 53 is open. Conversely, if the south pole of the external magnet comes close (i.e., comes closer than the south pole of the external magnet) to the surface 145, then the sheet magnet 140 is repelled toward the set 90 of ports, and the valve 53 is closed.

Figure 7:
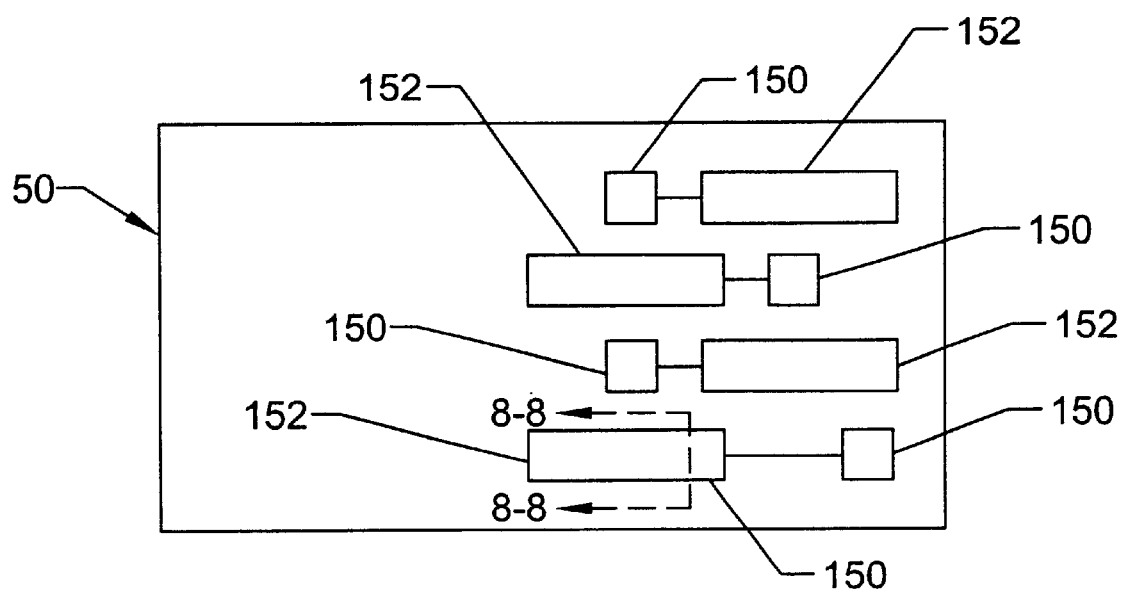
FIG. 7 is a side view of the fuel cell stack and an arrangement to remotely control valves of the stack according to an embodiment of the invention.
Figure 8:
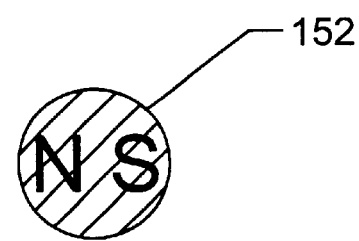
FIG. 8 is a cross-sectional view of a magnet of FIG. 7 taken along line 8—8.

Referring to FIG. 7, in some embodiments, to remotely operate the valves 53, external and generally cylindrical magnets 152 may be used. In this manner, each magnet 152 may be polarized across its diameter (as depicted in FIG. 8) and may be rotated about its cylindrical axis via a small electric motor 150, for example. In this manner, in some embodiments, each the motor 150 and magnet 152 assembly may be mounted outside of the plate module 5a and be positioned to remotely control one of the valves 53. In some embodiments, non-cylindrical external magnets may be used, and some embodiments the positions of the magnets may be changed manually, for example. External electromagnets may also be used to operate the valves 53.

Figure 9:
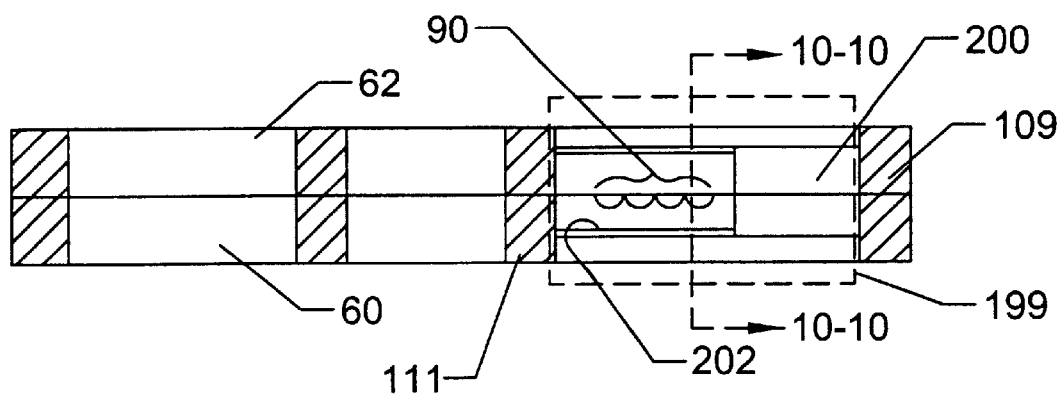
Figure 10:
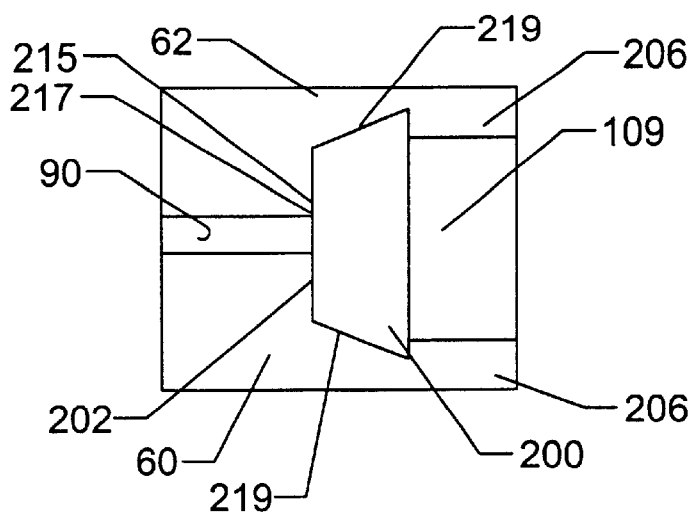
FIG. 10 is a cross-sectional view of the valve of FIG. 9 taken along line 10—10.
Figure 11:
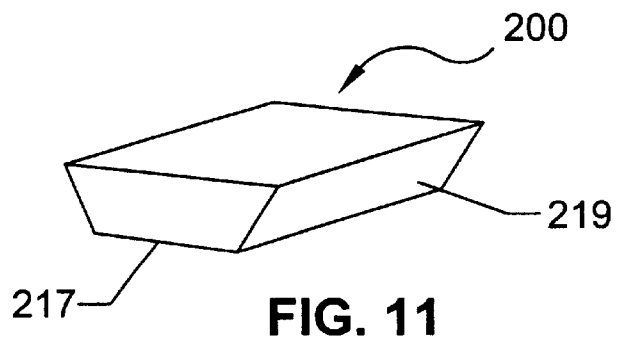
FIG. 11 is a perspective view of a magnet of the valve of FIG. 9 according to an embodiment of the invention.

Referring to FIG. 9, in some embodiments, a valve 199 may be used in place of the valve 53. Unlike the valve 53, the valve 199 slides along a groove 202 that is formed in the edges of the plates to open and close the set 90 of ports. As depicted in FIG. 9, due to this arrangement, the lateral extensions 106 into the hydrogen outlet passageway 68 are not be needed. The valve 199 may be formed from a magnet 200 that is confined to slide against the edges of two adjacent plates (the anode cooler plate 62 and the bipolar plate 60, as an example) via the groove 202. As an example, a particular valve 199 may be formed using the bipolar plate 60 and the anode cooler plate 62. In this manner, the anode cooler plate 62 and the bipolar plate 60 may laterally extend into the hydrogen outlet passageway 68 to form an approximate V-shaped cross-section for the groove 202, as depicted in a cross-section of the valve 199 in FIG. 10. A face 215 of the groove 202 that includes the set 90 of ports is approximately flat and receives a mating surface 217 (see also FIG. 11) of the magnet 200 to close the valve 199. Inclined sides 219 of the magnet 200 conform to the corresponding inclined surfaces of the groove 202 so that the magnet 200 is confined to slide in the groove 202 between vertical sidewalls 109 and 111 of the hydrogen outlet passageway 68.

Figure 12:
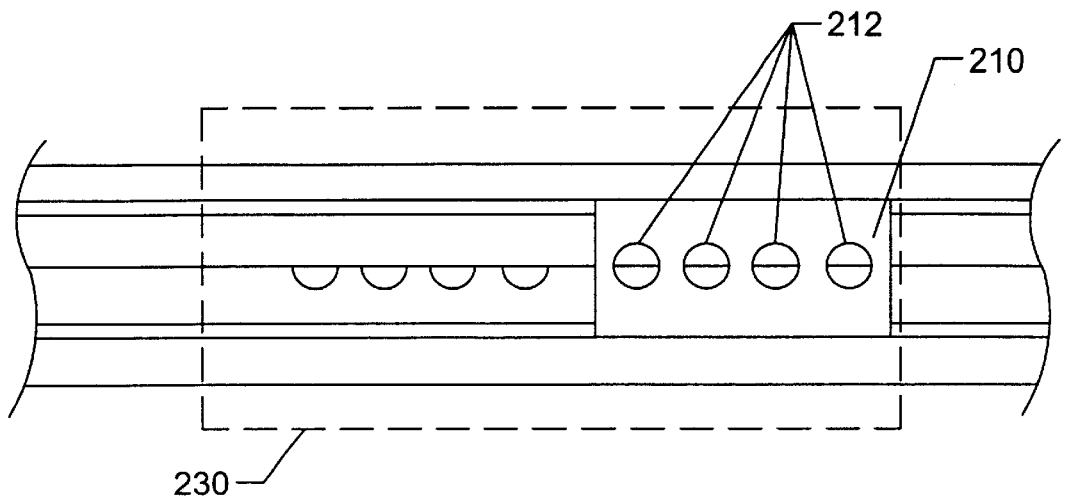
Figure 13:
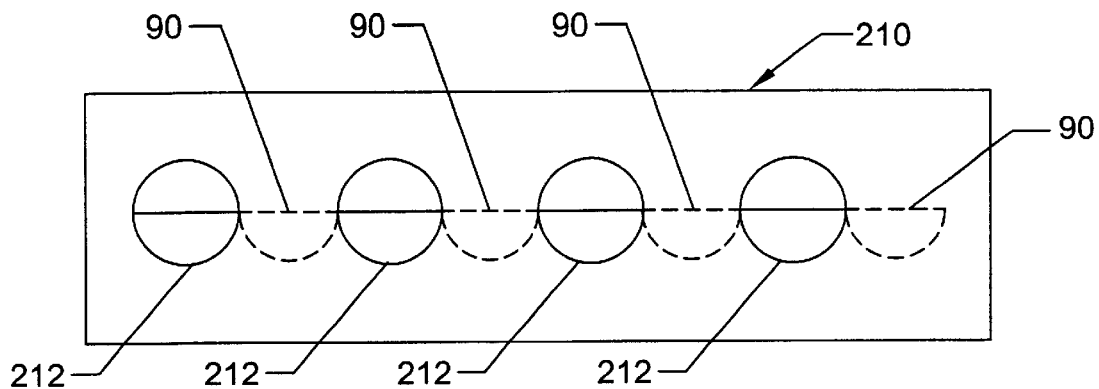
FIGS. 13 and 14 are schematic diagrams illustrating operation of the valve of FIG. 12.
Figure 14:
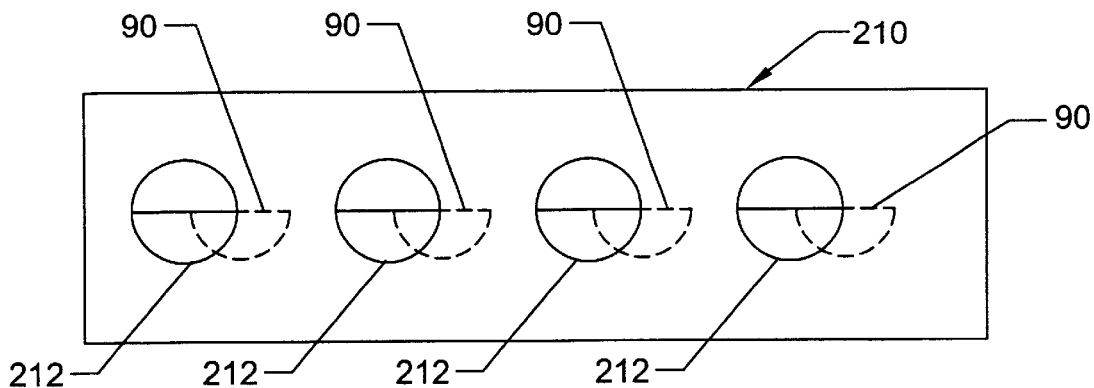

Referring to FIG. 12, in some embodiments, a valve 230 may be used in place of the valve 53 or 199. The valve 230 may be similar to the valve 199 in that the valve 230 includes a magnet 210 that has an approximate V-shaped cross-section and is confined to slide in an approximate V-shaped groove along the edges of the plates. However, unlike the magnet 200, the magnet 210 includes orifices 212 that may be selectively aligned with the set 90 of ports to regulate the flow out of a particular fuel cell. Thus, instead of turning on or off the fuel cell, the hydrogen flow out of the fuel cell may be precisely regulated to control performance of the fuel cell. In this manner, referring to FIG. 13, the magnet 210 may be moved to align the set 90 of ports between the orifices 212 to shut off the hydrogen flow and thus, shut off the fuel cell. However, as depicted in FIG. 14, the magnet 210 may be moved so that the holes 212 partially align with the set 90 of ports to selectively restrict the hydrogen flow to cause the desired pressure drop, for example.

Figure 15:
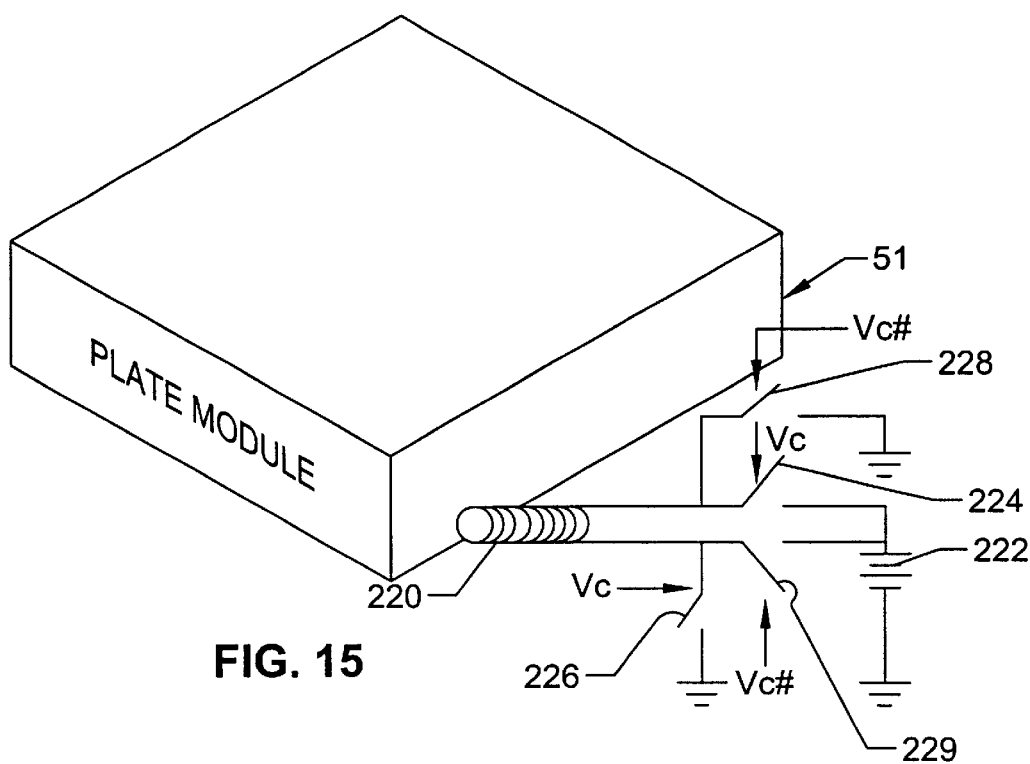
FIGS. 15, 16 and 17 are perspective views of different arrangements to control valves according to different embodiments of the invention.

Referring to FIG. 15, the magnet 200, 210 of the valve 199, 230 may be controlled by one or more electromagnet assemblies. In this manner, in some embodiments, each assembly may be associated with a particular valve of the stack and may include an electromagnet 220. The magnetic moment, or polarity, of the electromagnet 220 may be varied via switches 224, 226, 228 and 229 of a relay, for example, to operate the valve 199, 230. In this manner, the switches 224 and 226 may be closed and the switches 228 and 229 may be opened to couple a DC voltage source 222 across the electromagnet 220 to establish one magnetic moment, and the switches 224 and 226 may be opened and the switches 228 and 229 may be closed to reverse the polarity of the DC voltage source 222 across the electromagnet 220 to reverse the direction of the magnetic moment of the electromagnet 220. For purposes of precisely controlling the position of the valve 230 to regulate the fluid flow, the voltage of the voltage source 222 may be varied (by a resistor divider (not shown), for example) to vary the intensity of the externally applied magnetic field.

Figure 16:
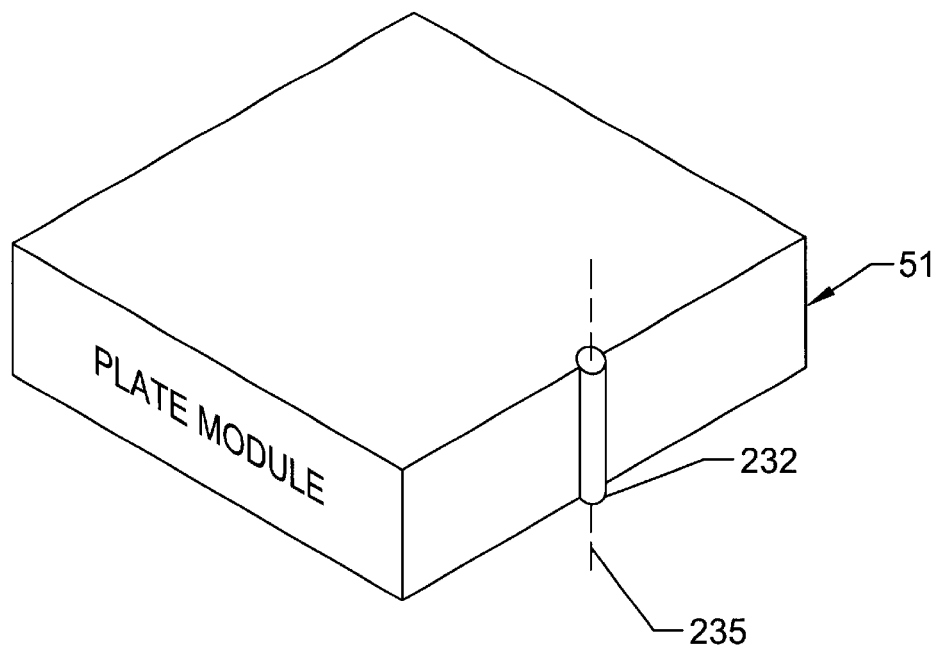

Referring to FIG. 16, in some embodiments, an upwardly extending permanent magnet 232 that is located beside the plate module 51 may be used to operate the valve 199, 230 by rotating the magnet 235 about its cylindrical axis 235. In this manner, one magnet may be used for each valve.

Figure 17:
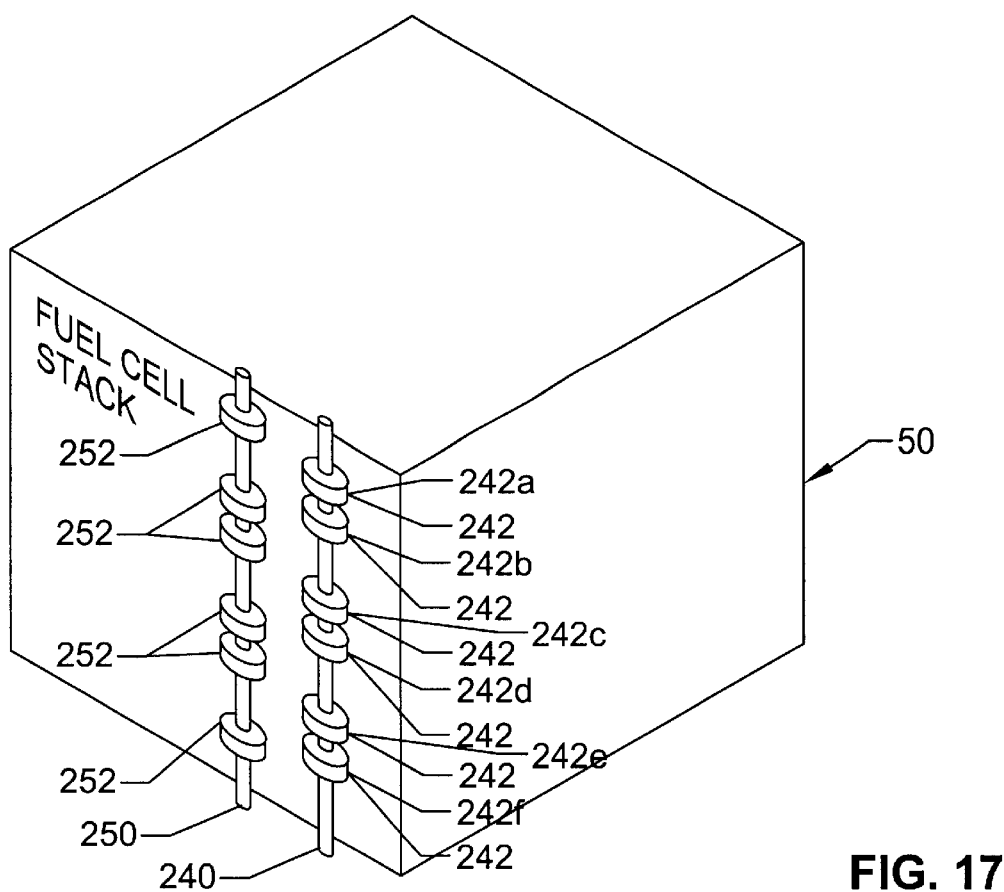

Referring to FIG. 17, in some embodiments, several valves (six, for example) of the fuel cell stack 50 may be operated by cylindrical magnets 242 (magnets 242a, 242b, 242c, 242d, 242e and 242f, as examples) that are secured to and rotate about a vertical axle 240. The magnets 242 are polarized across their diameters. In some embodiments, the magnets 242 may be phased with respect to each other so that each magnet 242 may exert a different magnetic force on its associated valve for a particular angular position of the axle 240. As depicted in FIG. 17, other valves of the fuel cell stack 50 may be operated by cylindrical magnets 252 that are secured to and rotate about a vertical axle 250. Therefore, due to this arrangement, the set 90 of ports that are associated with the bipolar plates may be operated by the magnets 242, and the set 90 of ports that are associated with the anode cooler plates may be operated by the magnets 252.

In the preceding description, directional terms, such as "vertical" and "horizontal," were used for reasons of convenience to describe the fuel cell stack and its associated components. However, such orientations are not needed to practice the invention, and thus, other orientations are possible in other embodiments of the invention. For example, the fuel cell stack 50 and its associated components, in some embodiments, may be tilted by 90°.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An assembly comprising:
    fuel cell plates arranged to form at least one fuel cell, the plates establishing a manifold passageway to communicate a fluid for the fuel cell and at least one of the plates including flow channels to communicate the fluid through the fuel cell; and
    a valve to selectively regulate communication of the fluid between the manifold passageway and the channels.
2. The assembly of claim 1, wherein the fluid comprises a reactant for the fuel cell and the valve is adapted to regulate a flow of the reactant to selectively turn the fuel cell off.
3. The assembly of claim 1, wherein each fuel cell plate includes an opening and the openings of the fuel cell plates are aligned to form the manifold passageway.
4. The assembly of claim 1, wherein the manifold passageway comprises an outlet passageway for the fluid.
5. The assembly of claim 1, wherein the valve is further adapted to be remotely operable.
6. The assembly of claim 5, wherein the valve is further adapted to be remotely operable by a magnetic field.
7. The assembly of claim 6, wherein the valve further comprises a magnet adapted to be operable by the magnetic field to selectively restrict the communication.
8. The assembly of claim 7, wherein the magnet is adapted to selectively block the communication near outlet ports of the channels.
9. The assembly of claim 7, wherein the magnet includes holes adapted to be aligned near outlet ports of the channels.
10. The assembly of claim 7, wherein the magnet comprises a permanent magnet having a groove with a predefined profile, and
    at least one of the fuel cell plates has a mating profile adapted to mate with the predefined profile and confine the magnet to slide within the groove.
11. The assembly of claim 10, wherein the groove comprises an approximate V-shaped groove.
12. The assembly of claim 7, wherein the magnet comprises a sheet magnet.
13. The assembly of claim 6, further comprising:
    a permanent magnet adapted to operate the valve by altering a direction of a magnetic moment of the permanent magnet with respect to the valve.
14. The assembly of claim 6, further comprising:
    an electromagnet to operate the valve by altering a direction of a magnetic moment of the electromagnet with respect to the valve.
15. The assembly of claim 6, further comprising:
    an electromagnet to operate the valve by altering an intensity of a force exerted by a magnetic field of the electromagnet on the valve.
16. The assembly of claim 1, wherein the fluid comprises a reactant.
17. The assembly of claim 16, wherein the reactant comprises hydrogen.
18. The assembly of claim 1, wherein the fluid comprises a coolant.
19. The assembly of claim 18, wherein the coolant comprises Therminol D-12.
20. An assembly comprising:
    fuel cell plates arranged to form fuel cells and including sets of channels, the plates arranged to establish a manifold passageway to communicate a fluid for the fuel cells and each set of channels adapted to communicate the fluid for an associated fuel cell; and
    valves, each different valve being associated with a different set of the channels to selectively regulate communication between the manifold passageway and the associated set of channels.
21. The assembly of claim 20, wherein the fluid comprises a reactant for the fuel cells and each valve is adapted to regulate a flow of the reactant to selectively turn the associated fuel cell off.
22. The assembly of claim 20, wherein each of the fuel cell plates includes an opening and the manifold passageway is at least formed in part by the openings.
23. The assembly of claim 20, wherein the manifold passageway comprises an output passageway for the reactant.
24. The assembly of claim 20, wherein each valve is further adapted to be remotely operable.
25. The assembly of claim 24, wherein each valve is further adapted to be remotely operable by a magnetic field.
26. The assembly of claim 25, wherein each valve further comprises:
    a magnet adapted to be operable by the magnetic field to selectively restrict the communication.
27. The assembly of claim 26, wherein the magnet is adapted to selectively block the communication near outlet ports of the associated set of channels.
28. The assembly of claim 26, wherein the magnet includes holes adapted to be aligned near outlet ports of the associated set of channels.
29. The assembly of claim 26, wherein the magnet comprises a permanent magnet having a groove with a predefined profile, and
    at least one of the fuel cell plates has a mating profile adapted to mate with the predefined profile and confine the magnet to slide within the groove.
30. The assembly of claim 29, wherein the groove comprises an approximate V-shaped groove.
31. The assembly of claim 26, wherein the magnet comprises a sheet magnet.
32. The assembly of claim 24, wherein at least one permanent magnet adapted to operate the valves by altering a direction of a magnetic moment of said at least one permanent magnet with respect to the valves.
33. The assembly of claim 24, further comprising:
    at least one electromagnet adapted to operate the valves by altering a direction of a magnetic moment of said at least one electromagnet with respect to the valve.
34. The assembly of claim 24, further comprising:
    at least one electromagnet to operate the valves by altering an intensity of a force exerted by a magnetic field of said at least one electromagnet on the valve.
35. The assembly of claim 20, wherein the fluid comprises a reactant for the fuel cells.

36. The assembly of claim 35, wherein the reactant comprises hydrogen.

37. The assembly of claim 20, wherein the fluid comprises a coolant.

38. The assembly of claim 37, wherein the coolant comprises Therminol D-12.

39. A method comprising:
   using fuel cell plates to form a fuel cell, the fuel cell plates including channels to communicate a fluid for the fuel cell and being arranged to form a manifold passageway to communicate the fluid; and
   selectively restricting communication between the channels and the manifold passageway.

40. The method of claim 39, wherein the selectively restricting comprises: remotely operating a valve.

41. The method of claim 39, wherein the selectively restricting comprises:
   using a magnetically responsive material near at least one port of the channels; and
   using a magnetic field to move the material to selectively restrict the communication.

42. The method of claim 41, wherein using the magnetic field comprises:
   varying a direction of a magnetic moment.

43. The method of claim 41, wherein using the magnetic field comprises:
   varying an intensity of a force of the magnetic field that is exerted on the material.

\* \* \* \* \*